United States Patent [19]

Wenger et al.

[11] 4,286,058
[45] Aug. 25, 1981

[54] ENZYMATIC CONVERSION OF HIGH MOISTURE SHEAR EXTRUDED AND GELATINIZED GRAIN MATERIAL

[75] Inventors: Lavon G. Wenger; Galen J. Rokey, both of Sabetha, Kans.; Itamar Ben-Gera, Antwerp, Belgium

[73] Assignee: Wenger Manufacturing, Sabetha, Kans.

[21] Appl. No.: 91,798

[22] Filed: Nov. 6, 1979

[51] Int. Cl.³ .................................. C12P 19/14
[52] U.S. Cl. ................................. 435/99; 127/38; 426/508; 435/161
[58] Field of Search ............... 426/508, 507, 618, 447, 426/448, 449, 450, 516; 127/38; 435/99, 161

[56] References Cited

U.S. PATENT DOCUMENTS

| | | | |
|---|---|---|---|
| 2,720,460 | 10/1955 | Flynn et al. | 426/450 |
| 3,054,677 | 9/1962 | Graham, Jr. et al. | 426/448 |
| 3,132,948 | 5/1964 | Smith et al. | 426/508 |
| 3,185,633 | 5/1965 | Krebs | 127/38 |
| 3,881,024 | 4/1975 | Pahoundis, Sr. et al. | 426/516 |
| 4,032,668 | 6/1977 | Jones et al. | 426/449 |

*Primary Examiner*—Joseph M. Golian
*Assistant Examiner*—George C. Yeung
*Attorney, Agent, or Firm*—Schmidt, Johnson, Hovey & Williams

[57] ABSTRACT

Methods and apparatus for high-moisture extrusion of starch-bearing grains is disclosed which yield cooked, gelatinized products suitable for short-time enzymatic conversion to sugars, and particularly those subject to fermentation to alcohol; the high production rates afforded through use of extrusion equipment, and the short conversion time of the resultant products, is particularly advantageous for economical alcohol manufacture, both for alcoholic beverages and for use as fuel. Preferably, whole or cracked starch-bearing grain is presoaked in an excess of water to a substantial moisture level, and the resultant slurry is fed to a specialized extruder. In the extruder the water is at least partially separated and carried from the process, and the grain is highly cooked and gelatinized for subsequent conversion. The overall apparatus preferably includes presoak tanks for the grain, a grain-conveying feeder, an extrusion cooker, and enzyme conversion tanks; the apparatus is advantageously sized for batch-continuous operations to produce a continuous flow of sugars. Conversion times for the gelatinized starches are low, less than about 45 minutes, and moisture and extrusion conditions can be altered to further lower sugar conversion time.

11 Claims, 8 Drawing Figures

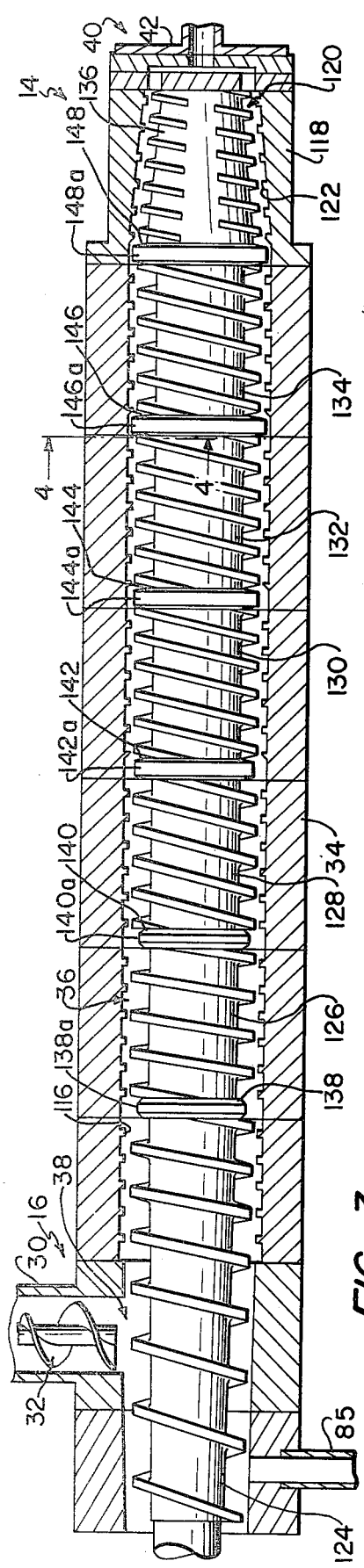

ENZYMATIC CONVERSION OF HIGH MOISTURE SHEAR EXTRUDED AND GELATINIZED GRAIN MATERIAL

BACKGROUND OF THE INVENTION

1. Field of the Invention

The present invention is concerned with apparatus and methods for treating starch-bearing grains such as corn, barley, wheat, rice and milo to cook and gelatinize the same on a continuous or semi-continuous basis for rendering the cooked grain suitable for enzymatic conversion to sugars. More particularly, it is concerned with such methods and apparatus which involve use of an especially configured extrusion cooker designed to handle grain slurries having considerable excess water, while at the same time establishing conditions of temperature, pressure and mechanical shear within the extruder for adequate cooking and gelatinization of the grain.

2. Description of the Prior Art

The production of alcohol from starch-bearing grains is in principle extremely old and well known. Generally speaking, prior practice involves placing the grain and water in a vat-type cooking vessel, followed by heating under pressure for a period of time to cook and gelatinize the grain. Subsequent to this, the cooked grain is treated with appropriate enzymes to break down the starch material into corresponding sugars. Such sugars can then be fermented by known means to give the desired alcohol.

Although alcohol making procedures of this type are widely followed, it will be appreciated that a significant investment in equipment is required. That is to say, in order to make the process economical, relatively large cooking and/or holding tanks must be employed. Moreover, the process is relatively time-consuming and is energy intensive, because of the large amount of heat needed to adequately cook and gelatinize the grain.

Of course, recent shortages of energy have accentuated the above problems. That is to say, the increasing cost of energy has concomitantly increased the production costs associated with conventional alcohol manufacture, thus raising the ultimate cost of this valuable commodity.

Therefore, there is a real need for an energy conserving, continuous or semi-continuous extrusion method for treating starch-bearing grains to yield gelatinized end products susceptible to relatively quick conversion to sugars. Prior patents describing various grain treatment methods include the following U.S. Pat. Nos. 129,906, 2,277,361, 2,884,327, 3,212,904, 3,248,228, 3,397,067, 3,411,429, 3,778,521, 3,778,522, 3,817,261, 3,778,512, 3,133,818, 3,132,948 and 4,128,051.

SUMMARY OF THE INVENTION

In one aspect of the invention, apparatus is provided for producing sugars from starch-bearing grain. Such apparatus broadly includes means such as a plurality of presoak tanks for contacting the starch-bearing grain with water or an aqueous medium to render the same soft and moisture-laden, along with an extrusion cooker for receiving the water-permeated grain (normally in the form of a grain-water slurry) from the presoak tanks. The extruder advantageously includes structure for at least partially separating the softened and moistened grain from the water, and for subjecting the grain to mechanical shear. Means is also provided for conveying the separated water from the extruder, and receiving vats or tanks are associated with the output of the extruder for receiving cooked and gelatinized grain therefrom for subsequent conversion to sugars.

The preferred extrusion device forming a part of the overall cooking and converting apparatus includes an elongated, tubular barrel equipped with an elongated, axially rotatable auger screw therein and an extrusion die at the outlet of the barrel. Means is provided for introducing the grain-water slurry (preferably at a controlled rate) into the inlet of the extruder. The structure for separation of grain and water within the extruder may be of various forms, e.g., a plurality of plate-like flow-restricting elements each presenting an outermost, smooth surface positioned in spaced relationship along the length of the auger screw which serves, with the adjacent surrounding sidewall portions of the barrel (such portions preferably likewise being smooth), to separate water from the grain and to subject the latter to mechanical shearing forces.

In particularly preferred forms of the invention, the starch-bearing grain is in whole or cracked form and, in general, has an average particle size at least equal to the average particle size of the corresponding grain meal. That is to say, in the exemplary case of corn the minimum average particle size usable should be substantially equivalent to that of corn meal.

It is also generally preferred to contact the starch-bearing grain with water or an aqueous medium (usually be presoaking in an excess of water) for a period of at least about 60 minutes (and more preferably for a period of from about 2–12 hours) for substantially permeating the grain structure with water. This is to be contrasted with mere wetting of a grain flour, for instance, which is a feature of many types of known extrusion cooking.

Although the extrusion conditions within the extruder of the invention can be varied over a relatively wide range, practically speaking the conditions should be in terms of temperature, pressure and mechanical shear to substantially cook and gelatinize the grain. More particularly, the amount of water present with the grain in the extruder, and cooking conditions established therein, should be sufficient for giving the extruded grain product a sugar conversion time of no more than about 45 minutes, when measured using the conventional tests of the brewing industry.

BRIEF DESCRIPTION OF THE DRAWINGS

FIG. 3 is a horizontal sectional view illustrating the internal construction of the extrusion cooker forming a part of the overall apparatus of FIG. 1;

FIG. 4 is a fragmentary vertical sectional view taken along line 4—4 of FIG. 3;

FIG. 5 is a fragmentary vertical sectional view taken along line 5—5 of FIG. 4;

FIG. 6 is a fragmentary horizontal sectional view of an extruder similar to that depicted in FIG. 3, but showing an alternate embodiment thereof;

DESCRIPTION OF THE PREFERRED EMBODIMENTS

Figure 1:
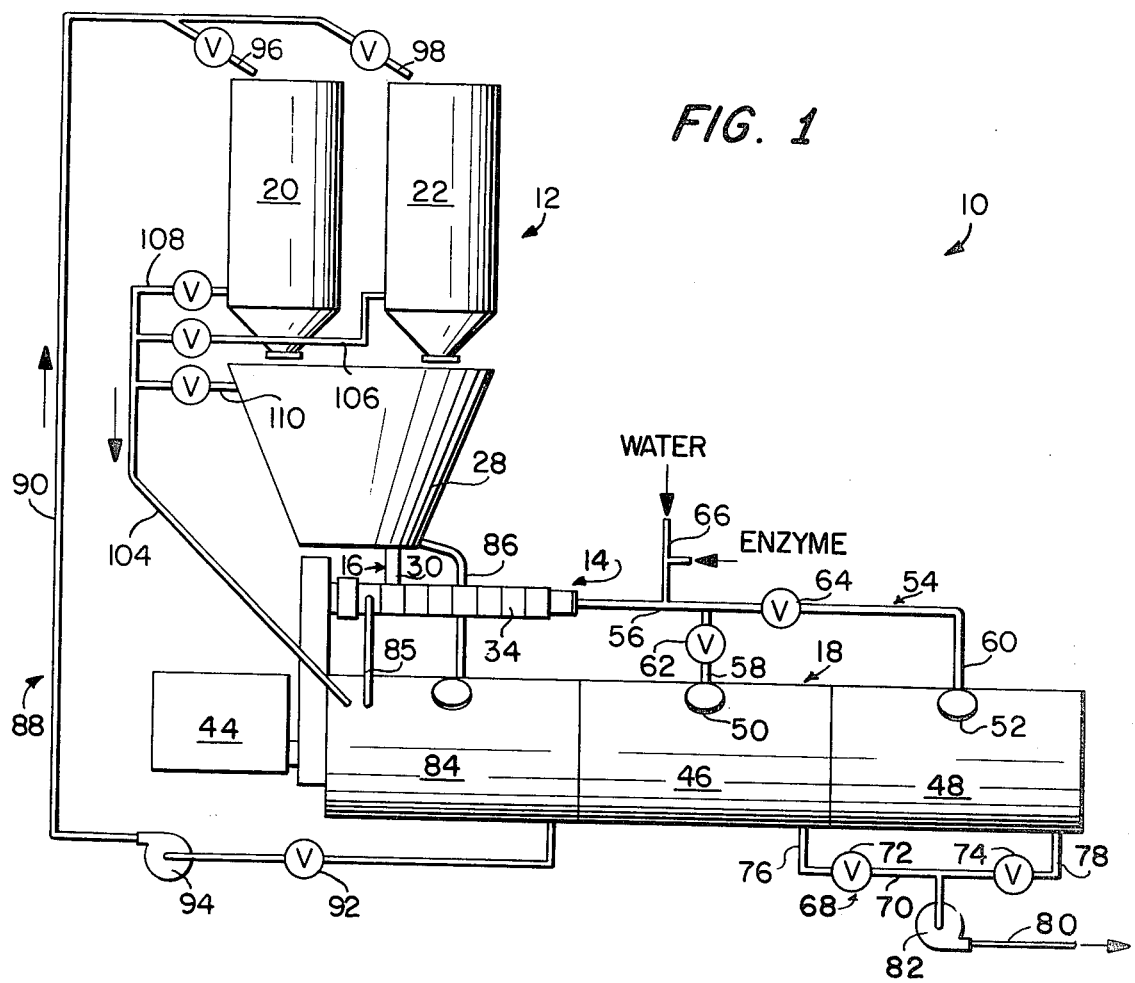
FIG. 1 is a somewhat schematic side elevational view of overall apparatus in accordance with the invention for presoaking, extrusion cooking and enzyme conversion of starch-bearing grain materials.
Figure 2:
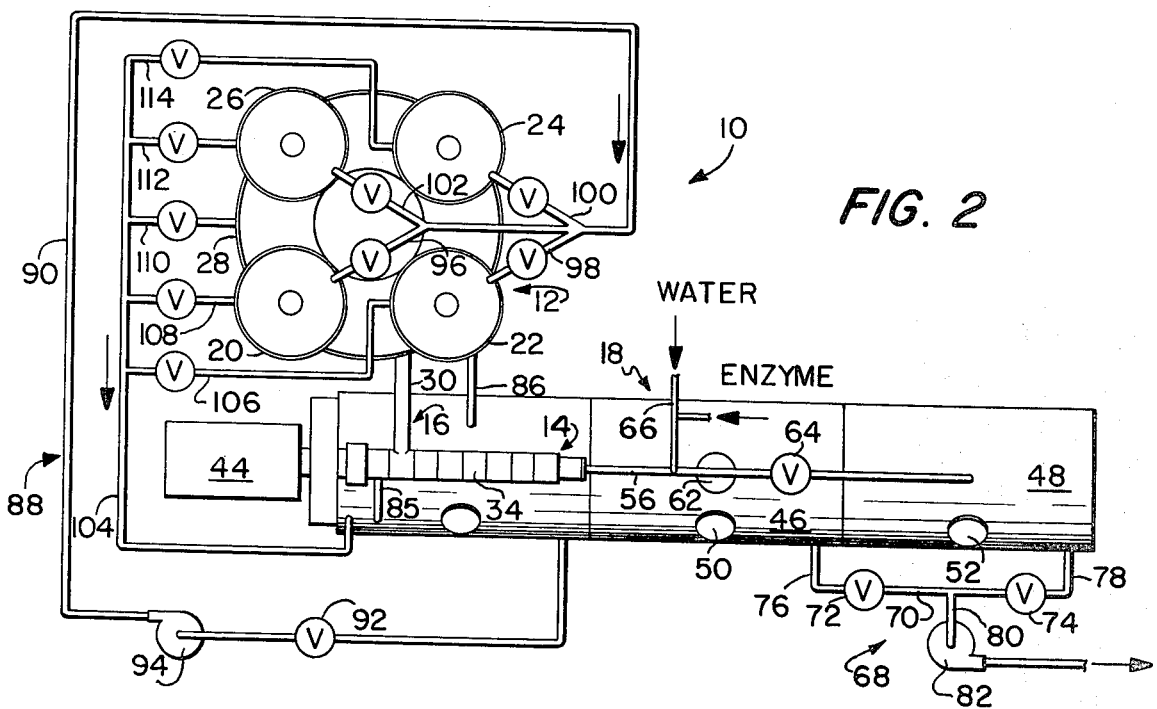
FIG. 2 is a plan view of the apparatus depicted in FIG. 1.

Turning now to the drawings, and particularly FIGS. 1-2, an overall apparatus 10 for producing sugars from starch-bearing grain is illustrated. Broadly speaking, the apparatus 10 includes means 12 for presoaking grain in an excess of water for softening and significantly raising the moisture content of the grain and thereby creating a grain-water slurry, extrusion cooker 14, means 16 for conveying the slurry from the means 12 to extruder 14, and tank means 18 for receiving cooked and gelatinized grain from extruder 14 for subsequent conversion thereof to sugars.

In more detail, soaking means 12 includes four separate, upright, open-top elevated tanks 20, 22, 24 and 26. The tanks 22-26, inclusive, are identical and spacially arranged as best seen in FIG. 2. The means 12 further includes a frustoconical, open top-feed hopper 28 positioned below the tanks 22-26 and oriented for receiving grain-water slurry from each of the latter. In this connection, it will be observed that the lowermost ends of the respective tanks 20-26 are positioned for gravitational delivery of the contents of the respective tanks into hopper 28.

Conveying means 16 is preferably in the form of an elongated pipe 30 extending between the bottom of hopper 28 and the sidewall of extruder 14. The pipe 30 communicates with each of the latter, and has disposed therewithin a feed auger 32 for positive feed of grain-water slurry from the hopper 28 to the extruder 14.

The internal construction of extruder 14 is described in complete detail below. For purposes of the present discussion however, it is sufficient to understand that the extruder includes an elongated, multiple section barrel 34 of tubular configuration, along with an elongated, multiple section, helical auger screw 36 disposed within the barrel. As best seen in FIG. 3, the auger is configured to present an inlet 38 and has an outlet end 40 equipped with an extrusion die 42. Conventional motive means 44 is operatively coupled to the screw 36 for axial rotation of the latter.

Receiving means 18 includes first and second conversion tanks 46 and 48 each equipped with an access port 50, 52. Piping structure 54 also forms a part of the receiving means 18 and includes a pipe 56 extending from the outlet end of extruder 14. Respective branch pipes 58, 60 communicate the pipe 56 with the underlying conversion tanks 46, 48. Conventional valves 62, 64 are respectively interposed in pipes 56, 58 for flow control purposes. In addition, a pipe tee 66 is connected to the pipe 56 for purposes of water and enzyme addition in the manner to be explained hereinafter.

A second piping structure 68 interconnects first and second tanks 46, 48 and includes a pipe 70 having separate valves 72, 74 therein, and respective, endmost pipes 76, 78 connected to the tanks 46, 48 as illustrated. A product outlet line 80 is operatively connected to pipe 70 between the valves 72, 74, and has a pump 82 interposed therein for the purpose of conveying final sugar-containing product from the overall apparatus 10.

In the preferred form of the apparatus 10 illustrated in FIGS. 1 and 2, a makeup tank 84 is provided beneath extruder 14 and generally aligned with adjacent tanks 46, 48. A conduit 85, which is important for purposes to be made clear, extends from extruder barrel 34 to makeup tank 84. In addition, an overflow line 86 extends between and communicates hopper 28 and the makeup tank 84.

A third piping structure broadly referred to by the numeral 88 serves to interconnect the makeup tank 84, the presoak tanks 20-26, and hopper 28. In detail, the structure 88 includes a main conduit 90 having a valve 92 and pump 94 interposed therein which extends from the tank 84 upwardly to the presoak tanks for delivery of water to the latter. To this end, respective, valved branch lines 96, 98, 100 and 102 are connected to main conduit 90 and extend to corresponding ones of the presoak tanks 20-26. (See FIG. 2). The structure 88 also includes a main conduit 104 which serves as a return to convey water from the tanks 20-26 and hopper 28, to the makeup tank 84. Thus, respective, valved, branch lines 106, 108, 110, 112 and 114 extend from the main conduit 104 to the four presoak tanks and hopper 28.

A feature of the present invention is that the extruder 14 of the overall apparatus 10 must be designed to handle moisture loads far in excess of those normally encountered in extrusion cooking of grains. In fact, the grain-water slurry fed to the extruder 14 preferably contains water in such excess that the tubular barrel of the extruder is completely filled with water adjacent the inlet thereof. In short, the extruder 14 must be equipped for such high moisture loads, in sharp contrast to conventional extrusion equipment wherein moisture levels are customarily relatively low. Turning now to FIGS. 3-5, the specialized structure associated with extruder 14 will be explained. Broadly speaking, the extruder includes structure for at least partially separating the grain and water fed thereto, and for subjecting the grain component to substantial mechanical shear in order to ensure adequate cooking and gelatinization thereof. Once this separation is effected, the excess, separated water is conveyed by means of the pipe 85 to makeup tank 84.

In more detail, the extruder 14, as noted above, includes barrel 34 made up of a plurality of elongated, tubular, end-to-end interconnected sections. Each section includes inwardly extending flighting 116, preferably spirally oriented, on the inner wall thereof. The outlet end of head or section 118 presents a generally frustoconical bore 120 therethrough, and is likewise equipped with spiral flighting 122.

The auger screw 36 is made up of a series of axially aligned, interconnected auger sections 124, 126, 128, 130, 132, 134, and 136. These sections are tubular and are keyed to a central splined shaft 137 operatively coupled to motive means 44. It will further be observed that a plate-like flow restricting element is interposed between each of the above enumerated sections; i.e., an element 138 between the sections 124 and 126; an element 140 between the sections 126 and 128; an element 142 between the sections 128 and 130; an element 144 between the sections 130 and 132; an element 146 between the sections 132 and 134; and an element 148 between the sections 134 and 136. It will further be seen that each of the elements 138-148, inclusive, is keyed to shaft 137 and presents an outermost, generally smooth and cylindrical surface 138a, 140a, 142a, 144a, 146a and 148a, and that the faces 142a-148a are somewhat wider than the faces 138a and 140a.

The internal wall of the barrel 34 at the areas adjacent the plates 138-148 is likewise configured to present a complemental, generally smooth and cylindrical surface in surrounding, radially spaced relationship to the surfaces 138a-148a. In effect, the internal wall portions or areas represent smooth, cylindrical wall surfaces as an interruption of the helical flighting provided along substantially the entirety of the internal wall surface of the barrel.

Referring again to FIG. 3, it will be seen that the clearance between the cylindrical surfaces of the flow-restricting elements, and the surrounding smooth barrel wall areas, decreases from a maximum at the element 138 closest to the barrel inlet 38, to a minimum at the element 148 closest to outlet end 40. Hence, as the grain-water slurry is advanced along the length of barrel 34, a partial separation of the water from the grain is effected, and moreover the grain is subjected to increasing mechanical shear.

It will also be seen that auger section 136 is of the cut flight variety. Use of this type of auger section adjacent outlet end 40 has proven advantageous, since this serves to increase the residence time and working of the grain just prior to extrusion thereof. However, use of such a cut flight screw is not deemed essential to success of the invention.

Figure 7:
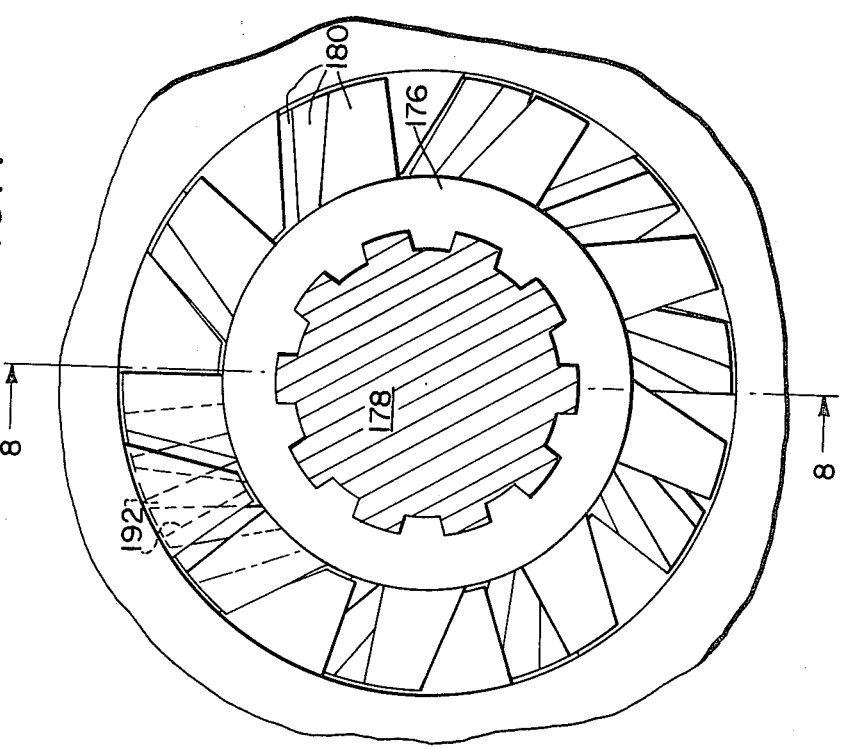
FIG. 7 is a vertical sectional view taken along line 7—7 of FIG. 6.
Figure 8:
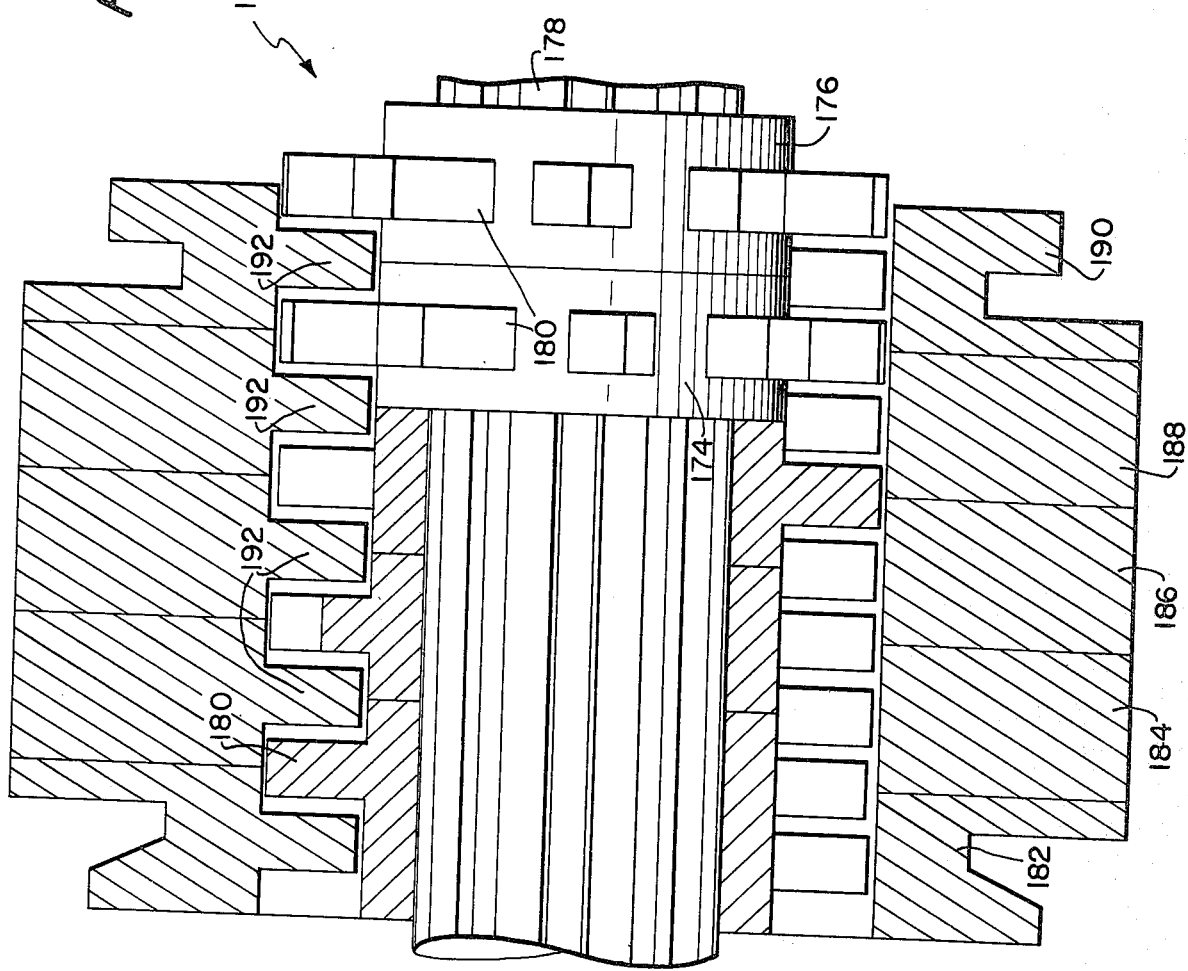
FIG. 8 is a sectional view taken along line 8—8 of FIG. 7.

Turning now to FIGS. 6-8, another embodiment in the form of an extruder 150 is illustrated. The extruder 150 is in most respects identical to extruder 14, and includes an elongated, multiple section tubular barrel 152 having an outlet end 154 covered by an orificed extrusion die 156, and a slurry inlet and excess water conduit identical to the elements 30, 85 illustrated in connection with extruder 14. An elongated, axially rotatable, multiple section auger screw 158 having helical flighting thereon is positioned within barrel 152, and has a plurality of flow-restricting plates 160 interposed between respective screw sections; however, it will be seen that the internal wall surfaces of barrel 152 adjacent the elements 160 are not smooth and cylindrical as in the case with extruder 14, but rather are flighted.

Water separation and grain shearing structure 162 forms a part of the extruder 150.

In essence, the structure 162 can be thought of as a separate section of the overall extruder, both in terms of the tubular barrel thereof, and the internal, rotatable screws. Specifically, the structure 162 includes elongated rotor means 164 forming a part of the overall screw 158, and stationary, complemental, tubular stator means 166 forming a part of the overall barrel 152 and in surrounding relationship to the rotor means 164.

Rotor means 164 comprises a plurality of annular, axially aligned and rotatable, abutting rotor sections 168, 170, 172, 174 and 176. Each of the rotor sections (see FIG. 8) is keyed to internal splined shaft 178 for rotation therewith (which supports the helical auger screw section as well and is operatively coupled to the motive means for the extruder). Each section 168-176 includes a series of radially outwardly extending, circumferentially spaced, block-like projections 180. The projections 180 on adjacent rotor sections are further circumferentially offset from sets are in alignment.

Stator means 166 is comprised of a series of annular, axially aligned and interconnected housing elements 182, 184, 186, 188 and 190. Each element has a set (preferably 10) of radially outwardly extending, circumferentially spaced teeth 192 thereon, and the sets of teeth are in circumferential alignment. These teeth 192 are complementally received between the sets of projections 180 on the adjacent rotor sections, as best seen in FIGS. 6 and 8. Further, it will be observed (see FIG. 8) that the projections 180 on rotor sections 168 and 170 are of equal thickness; that the projections 180 on the sections 172, 174 are of the same thickness, but thicker than the projections of sections 168, 170; and that the projections on section 176 are thicker than any of the projections on the other rotor sections. Hence, the lateral clearance provided between adjacent projections 180 and teeth 192 decreases going from left to right in FIG. 8.

As can be appreciated from the foregoing description, the structure 162 serves to effect a separation of water from the grain passing through extruder 150, and also to subject the grain to mechanical shear. These effects are enhanced by virtue of the circumferential offset between the projections 180 on adjacent rotor sections, and by the decreasing lateral clearance between the projections 180 and teeth 192 described above.

The preferred operation using the overall apparatus 10 would normally proceed as follows. First, four respective charges of starch-bearing grain are fed to the presoak tanks 20-26. Although a wide variety of starch-bearing grains can be used in the processes of the invention, preferably grain selected from the group consisting of corn, wheat, milo, rice, barley and mixtures thereof is used. The grain can be in either whole or subdivided form (subdivided grain fractions such as cracked whole corn or degerminated corn meal being included). The whole or cracked grain, at a minimum, should be of an average size at least about equal to the average size of the corresponding grain meal. Thus, in the exemplary case of corn, the average particle size should be at least about the average particle size of corn meal. Generally speaking, grain flours are not as readily usable as the preferred whole or cracked grains.

A quantity of an aqueous medium is then placed in the presoak tanks 20-26. In some cases this medium may consist only of water, but in particularly preferred forms of the invention, sufficient acid is present therein to lower the pH of the medium to a level of at least about 4, and most preferably to a pH within the range of about 4.0 to 6.5. Normally, an excess of the aqueous medium is used in the presoak tanks. Broadly however, the medium should be present at a level of from about 20 to 700% by weight, based upon the total weight of the grain taken as 100%. Most preferably, this level is from about 100 to 500%.

The grain is allowed to stand in the aqueous medium for a period of time sufficient to soften and moisturize the grain. That is to say, presoaking should continue until the grain structure is substantially permeated with the aqueous medium and is moisture laden. This is to be contrasted with mere wetting of a grain flour for example, which is commonly done in connection with prior extrusion processes. In such prior processes the flour and moisture are not contacted for a time sufficient to establish the type of permeation herein sought. In terms of time, the presoak should continue for a period of at least about 60 minutes, and more preferably for a period of about 2-12 hours (most preferably about 3-4 hours). In terms of moisturization, the grain should be moisturized to a level of at least about 60% of the saturation level of the grain, and more preferably to a level of at least about 80% of the saturation level.

The next step in the preferred process involves delivery of the grain-medium slurry from one of the presoak tanks through hopper 28 and ultimately to the inlet of extruder 14 via pipe 30. As the slurry is fed (using auger 32 for this purpose), the helically flighted extrusion auger 36 is axially rotated in the well known manner for advancing the slurry towards outlet end 40. In this connection it will be understood that in preferred forms the amount of liquid passing into the barrel 34 is sufficient to completely fill or "choke" the barrel adjacent the inlet thereof. Accordingly, excess water passes through the conduit 85 for delivery to makeup tank 84. As the slurry passes down the length of barrel 34, it encounters the spaced elements 138-148. The decreasing clearance presented between these elements and the surrounding wall surfaces of the barrel in effect serve to separate a further portion of the aqueous medium from the grain, and such liquid passes through the pipe 85 to tank 84. In addition, the elements 138-148, in cooperation with the surrounding wall surfaces, subject the grain to mechanical shear. Of course, such shearing forces are likewise developed by the helical flighting on the respective screw sections and the adjacent flighting on the barrel sections. In any event, as the grain passes through the barrel 34, it is partially cooked and further subdivided.

In the final section of extruder 14, cut flight screw 136 further serves to subdivide and disrupt the grain structure just prior to extrusion thereof. Of course, the extrusion process itself completes the cooking and gelatinization of the corn in the known fashion.

In the extruder 14, grain is subjected to elevated temperatures (which may be augmented by injection of steam into the barrel in the intermediate sections thereof if desired). Preferably, the temperature within the extruder should be within the range of about 125° to 500° F., and more preferably from about 250° to 400° F. The principal purpose, of course, is to adequately gelatinize the starch-bearing grain, and the temperature conditions selected should be consistent with this purpose. Correspondingly, the pressure conditions within the extruder should be at a level of from about 75 to 600 psig,, and more preferably from about 100 to 400 psig. Moreover, the extruder should be designed so that at least about 10% by weight of the original aqueous medium present in the slurry is separated from the grain. Finally, the overall conditions within the extruder should be established such that the extruded product is at least about 70% gelatinized, and more preferably at least about 95% gelatinized.

Subsequent to extrusion of the grain, the extrudate passes through the pipes 56, 58 to one or both of the conversion tanks 46, 48. Known amounts of enzyme and cool water (if needed) are added through tee 66 and ultimately into the tanks 46, 48. Enzymatic conversion of the gelatinized extrudate then proceeds, and temperature conditions within the tanks can be regulated by the water addition for optimum enzyme conversion. After conversion to sugars is completed, the contents of the tanks 46, 48 exits through line 80. It will be understood that provision of two tanks 46, 48 facilitates and makes possible the desired batch-continuous operation of apparatus 10.

It will be understood that when the extrusion of the first charge of slurry is completed, and during the time that the extrudate is being converted in one of the tanks 46, 48, a second charge is delivered through hopper 28 to extruder 14 for similar processing. Also, as soon as a charge of slurry exits one of the presoak tanks, it is refilled with grain and aqueous medium to commence the presoaking cycle again. Preferably, the tanks 20-26, extruder 14 and receiving means 18 should be sized so that, after the initial four charges of grain are moisturized, the process becomes batch-continuous. Continuous operation of this type is greatly facilitated through use of makeup tank 84. That is to say, the separated water from extruder 14 is fed to makeup tank 84, and this water is reused by conveying the same through piping structure 88 to the presoak tanks. Further, any overflow from the tanks 20-26 or hopper 28 is returned via line 104 to the makeup tank. Additional overflow capacity is provided by means of the pipe 86 as illustrated in FIGS. 1-2. Hence, any starch material separated in the extruder 14 and passed to the makeup tank 84 is ultimately reused in the process. This reduces effluent from the process, and conserves the valuable starch material.

Operation of the above described process using extruder 150 proceeds as described above, except that the medium separation and grain shearing operation is accomplished through the use of structure 162. Specifically, the rotating, circumferentially offset series of projections 180, and the cooperating, stationary teeth 192, serve to effectively separate at least a portion of the moisture from the grain, and also to further subdivide and shear the grain.

Although the preferred method of operation in accordance with the invention involves the described presoaking, such is not absolutely necessary. With certain types of products and equipment, it is only necessary to place a mixture of grain and aqueous medium (e.g., water and acid if desired) into the extruder barrel without substantial presoaking, whereupon extrusion proceeds as outlined above wherein at least a portion of the medium is separated from the grain, and the latter is subjected to mechanical shear for cooking and gelatinizing purposes. Here again however, the liquid should be present in the extruder in an excess relative to the grain, and normally in a quantity sufficient to completely fill or choke the extruder barrel adjacent the inlet thereof. This assures that adequate moisture is present with the grain for complete gelatinization.

When it is desired to produce fermentable sugars in accordance with the invention, the amount of water used with the grain (whether or not presoaking is done), and the cooking conditions established in the extruder, should be sufficient for giving the extruded grain a conversion time of no more than about 45 minutes, preferably no more than about 30 minutes, and most preferably no more than about 15 minutes. As used herein, "conversion time" refers to time of conversion of the cooked product to sugars using the conventional test of the brewing industry. This test is fully described in "Adjunct Materials," Cereals-5 "Mashing Procedure" and "Conversion" as published by The American Association of Brewers, pages 2 and 3 of 7.

The following Examples illustrate the present invention, but nothing therein should be taken as a limitation upon the overall scope of the same.

EXAMPLE 1

In this Example, a number of products (Runs Nos. 3-7, inclusive, Table I) in accordance with the invention were compared with conventionally manufactured kibbled corn and corn curl products (Runs Nos. 1 and 2) in terms of time for enzymatic starch conversion to fermentable sugars. In each case the products were cooked in a Wenger X-20 Extruder equipped with a known auger screw (including a cut flight screw section adjacent the die) and various die configurations and with use of a 1 inch die spacer between the last barrel section and die. Extrusion conditions and conversion times are set forth in Table I.

Run No. 1 involved processing of 1/16" ground whole corn without presoaking thereof, i.e., simply by mixing water with ground corn to achieve the liquid initial moisture figure (initial moisture data given in terms of percent by weight). The moisturized mass was then passed through the X-20 Extruder at the listed conditions (temperature being measured at the last barrel head adjacent the final die) using a die having one opening of ⅜" diameter as recorded. The kibbled corn product emerging from the extruder was cut and dried to 7.3% total moisture. No acid modification was employed. The final product was then independently tested by conventional brewing industry techniques to determine enzyme conversion time.

A similar test was performed by conventionally manufacturing expanded corn curls and testing the same for conversion. Here again, no presoaking step was performed, and no acid modification used. After extrusion at the listed conditions, the extrudate was tested for conversion time.

In both of the above tests, the conversion time was unacceptable, being on the order of 60 minutes or above. Hence, it was determined that these conventional processes were not suitable for the production of low conversion time gelatinized starch products.

Runs Nos. 3-7, inclusive, were likewise run on the X-20 machine using the same auger screw, but in certain cases with different configuration dies as recorded. In all of these Runs the corn or milo was presoaked to the initial moisture level listed (this figure represents total moisture, i.e., native moisture in the grain as well as that added by virtue of presoaking). The average time of presoaking was approximately three hours. In Runs Nos. 3, 4, 6 and 7, phosphoric or sulfuric acid was added with the presoak water and lowered the pH thereof to the figures listed in Table I.

After presoaking, the slurries were fed to the X-20 machine, and sufficient water was present to "choke" the barrel thereof adjacent the inlet. In fact, considerable water passed back out of the inlet as cooking proceeded. Extrusion temperatures are listed in Table I, along with screw speed readings. Pressure conditions within the extruder varied within the range of 100-150 psig during the runs.

The products were measured for moisture upon extrusion, and without any drying thereof. This data is listed under the "Product Moisture" column of Table I. Finally, the extruded and gelatinized grain products from Runs Nos. 3-7 were tested for enzymatic conversion time (again using the conventional brewer's test). These results are set forth in Table I, and demonstrate that operation in accordance with the invention yields products suited for production of fermentable sugars.

EXAMPLE 2

In this Example two runs (Nos. 8 and 9) were performed in the manner described in Example 1. However, in this series of tests no presoaking of the grain was performed; rather, the grain and moisture was simply placed within the barrel of the X-20 Extruder by simultaneous feeding thereof. Sufficient water was employed to "choke" the barrel of the extruder.

Extrusion conditions are fully set forth in Table II.

Conversion time data for these two runs demonstrates that, given proper conditions of moisture and extrusion parameters, good products can be produced without presoaking.

TABLE I

| Run | Grain/Condition | Initial Moisture | Extrusion Temp. (°F.) | Screw RPM | Die Type | Product Moisture | pH | Conversion Time |
|---|---|---|---|---|---|---|---|---|
| 1 | Corn, 1/16" | 25.0 | 225 | 540 | 1/3/8" | 7.3 | 6.5 | Partial in 60 min. |
| 2 | Corn, #333 meal | 18.0 | 250 | 400 | 1/3/8", 3/5/32" | 5.1 | 6.6 | Very slight, 60 min. |
| 3 | Corn, whole | 46.0 | 315 | 400 | 3/5/16", 1/15/64" | 49.2 | 4.1 | 10-15 min. |
| 4 | Corn, whole | 46.0 | 318 | 400 | 1/3/8", 3/5/16" | 40.2 | 4.1 | 7-10 min. |
| 5 | Corn, whole | 37.4 | 330 | 540 | Adjustable | 31.6 | 6.4 | 15-20 min. |
| 6 | Corn, cracked | 46.0 | 235 | 540 | 1/1/4" | 49.6 | 5.3 | 35-40 min. |
| 7 | Milo, cracked | 46.0 | 340 | 185 | 1/1/4" | 42.6 | 4.9 | 30-35 min. |

TABLE II

| Run | Grain/Condition | Extrusion Temp. (°F.) | Screw RPM | Die Type | Product Moisture | pH | Conversion Time |
|---|---|---|---|---|---|---|---|
| 8 | Corn, cracked | 340 | 540 | 1/1/4" | 23.0 | 6.5 | 20-25 min. |
| 9 | Corn, 1/16"grind | 160 | 400 | 6/1/4" | 53.0 | — | 15-20 min. |

EXAMPLE 3

In this Example three additional runs (Nos. 10-12) were performed using Gooch No. 888 degerminated corn meal. In each case the meal was presoaked to a level of 41% by weight moisture, using water and acid (pH=5.0) as the presoaking medium. Here again, the X-20 machine was used for extrusion purposes, at the conditions listed in Table III. Final product moistures were recorded, along with enzyme conversion times. Very good products were obtained, as demonstrated by the low conversion times recorded.

As those skilled in the extrusion art will readily understand, use of various sizes and types of extruders may require some alteration in operating conditions to achieve equivalent products. For example, the conditions needed to obtain acceptable products in a relatively small X-20 machine (such as screw RPM) may be somewhat different than the necessary conditions in the case of a large, industrial size unit such as a Wenger X-200 machine. Generally speaking, conditions of moisture and extrusion parameters should be used for giving a final galatinized extrudate having a standard conversion time of no more than about 45 minutes, and preferably less.

Among the many advantages of the present invention, one of the most significant is the fact that fermentable sugars can be produced using much less energy per unit of product. In fact, it is estimated that the present apparatus and methods will produce satisfactory fermentable sugars using no more than about one-half the energy conventionally required. This is attributable not only to the high production rates achievable with extrusion cooking, but also because the necessity for dry grinding of corn (which consumes significant energy) is eliminated or significantly reduced.

TABLE III

| Run | Grain/Condition | Initial Moisture | Extrusion Temp. (°F.) | Screw RPM | Die Type | Product Moisture | pH | Conversion Time |
|---|---|---|---|---|---|---|---|---|
| 10 | Corn Meal, #888 | 41.0 | 320 | 200 | 1/7/16", 6/1/4" | 37.4 | 5.0 | 7–10 min. |
| 11 | " | 41.0 | 320 | 400 | " | 37.0 | 5.0 | 10–15 min. |
| 12 | " | 41.0 | 225 | 400 | " | 37.6 | 5.0 | 10–15 min. |

Having thus described the invention, what is claimed as new and desired to be secured by Letters Patent of the United States is:

1. A method of producing sugars from a starch-bearing material, comprising the steps of:
   providing a quantity of a starch-bearing grain material;
   soaking said material in an aqueous medium, said aqueous medium being present at a level of at least about 100%, based upon the weight of said material taken as 100%, until said material is substantially permeated with said aqueous medium and moisturized to a level of at least about 80% of the saturation level of the material;
   passing said permeated and moisturized wet material into the inlet of the barrel of an elongated extruder equipped with a rotatable material-conveying screw and an apertured, flow-restricting extrusion die plate;
   rotating said screw in order to move said wet material along the length of said barrel, subjecting said wet material to elevated temperatures and pressures during passage thereof along the length of said barrel, and subjecting said wet material to mechanical shear and passing the wet material through the aperture of said die plate to gelatinize at least about 95% of the gelatinizable fraction of the wet material passed through said aperture and give at least a portion of the gelatinized material a conversion time of no more than about 45 minutes; and
   adding an enzyme to said gelatinized material without drying of the gelatinized material to convert at least a portion of the gelatinized material to said sugars.

2. The method as set forth in claim 1, including the steps of:
   separating at least a portion of said aqueous medium from said material within said barrel, and passing said separated aqueous medium out of said barrel through an outlet separate from said aperture through said die plate.

3. The method as set forth in claim 2, including the step of passing said wet material into said barrel along with sufficient aqueous medium to completely fill the barrel adjacent said inlet.

4. The method as set forth in claim 1, wherein said material is soaked in said aqueous medium for a period of at least about 60 minutes.

5. The method as set forth in claim 1, wherein said level of aqueous medium is from about 100 to 500 percent.

6. The method as set forth in claim 1, wherein said starch-bearing grain material is selected from the group consisting of whole starch-bearing grain, subdivided starch-bearing grain, subdivided starch-bearing grain fractions and mixtures thereof.

7. The method as set forth in claim 6, wherein said subdivided starch-bearing grain and fractions thereof are of an average size at least about equal to the average size of the corresponding grain meal.

8. The method as set forth in claim 1, wherein said aqueous medium includes an acidifying agent.

9. The method as set forth in claim 1, wherein said medium has a pH of from about 4.0 to 6.5.

10. The method as set forth in claim 1, including the step of subjecting said wet material to elevated temperatures within the range of from about 250° to 400° F. during passage of the wet material along the length of said barrel.

11. The method as set forth in claim 1, wherein said starch-bearing grain material is selected from the group consisting of corn, wheat, milo, rice, barley and mixtures thereof.

* * * * *